Oct. 6, 1953   K. H. PECH   2,654,564
SHUTTLE VALVE

Filed Dec. 24, 1949   2 Sheets-Sheet 1

Inventor
Karl H. Pech
by Roberts Cushman Grover
Att'ys.

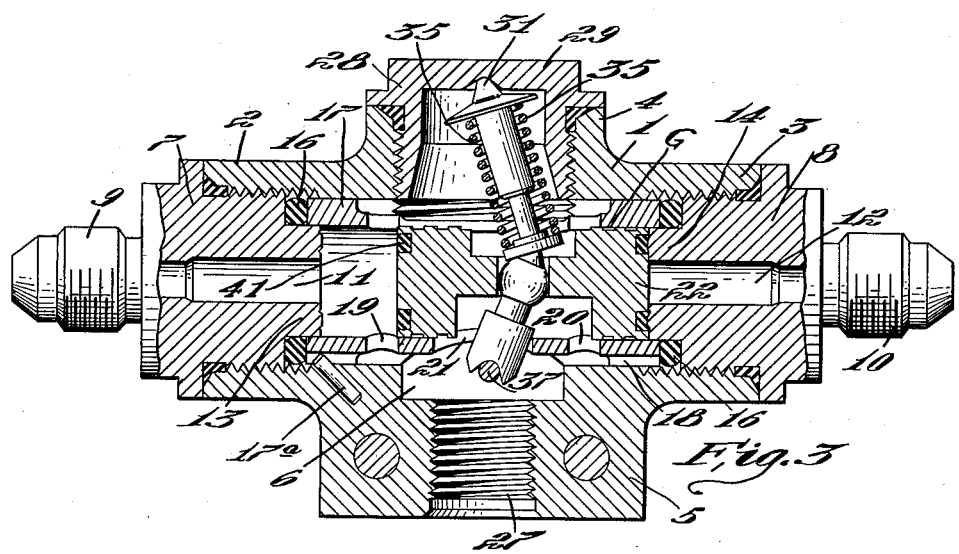

Patented Oct. 6, 1953

2,654,564

UNITED STATES PATENT OFFICE 2,654,564

SHUTTLE VALVE

Karl H. Pech, Bridgeport, Conn., assignor to Manning, Maxwell & Moore, Incorporated, New York, N. Y., a corporation of New Jersey Application December 24, 1949, Serial No. 134,884

4 Claims. (Cl. 251—118)

This invention pertains to valves of the kind known as shuttle valves wherein the opposite ends of a sliding piston are alternatively engageable with spaced, coaxial inlet valve seats, the piston being automatically shifted by the dominant inlet pressure. Valves of this kind are useful for various purposes, for instance, but without limitation, in hydraulic systems for the actuation of aircraft controls where, for example, such a valve may be used for automatically cutting out a motor-driven pump and for cutting in a hand-actuated pump in the event of failure of the motor-driven pump to maintain the requisite pressure in the system.

It has heretofore been proposed to provide means of snap action type for moving the piston quickly and forcibly toward one or the other of its seats upon shift in the dominant pressure, but heretofore such snap action devices have usually been of such design as to impose a lateral pressure upon the piston, thus increasing its frictional resistance to movement and inducing eccentric wear. In the operation of valves of this type, as heretofore constructed, difficulty has been experienced, when one of the supply lines becomes blocked with oil or the like, in causing the piston to seat so as completely to close the blocked line. It has also been found difficult to obtain a proper seal between the piston and its seat at low pressures and to prevent unseating and leakage due to turbulence at high flow velocity. Another difficulty has been that of preventing interflow between the inlet ports, which is particularly serious when different fluids are delivered through the respective inlet ports.

The present invention has for one object the provision of a shuttle valve so constructed and arranged as to avoid the above difficulties and in particular to provide a snap action shuttle valve in which the piston is substantially free from the imposition of lateral pressure but which, when seated, is subject to a sufficient, axially applied load to insure a positive seal even at low pressures and to prevent unseating and leakage at high flow velocities. A further object is to provide a shuttle valve so designed as to permit the employment of a rubber seat element under operating conditions which exceed the physical strength of the rubber. A further object is to provide a shuttle valve of simple and durable construction wherein the movement of the piston is automatic and results solely from the differential pressures of the fluids supplied to its inlet ports. Other and further objects and advantages of the invention will be pointed out in the following more detailed description and by reference to the accompanying drawings wherein:

Fig. 3 is a similar view showing the piston seated against the right-hand seat;

Fig. 4 is a fragmentary, radial section through one of the valve seats, to much larger scale, illustrating the deformable sealing material; and Fig. 5 is a transverse vertical section, to larger scale than Fig. 1, through the valve piston substantially at its mid-point.

Figure 1:
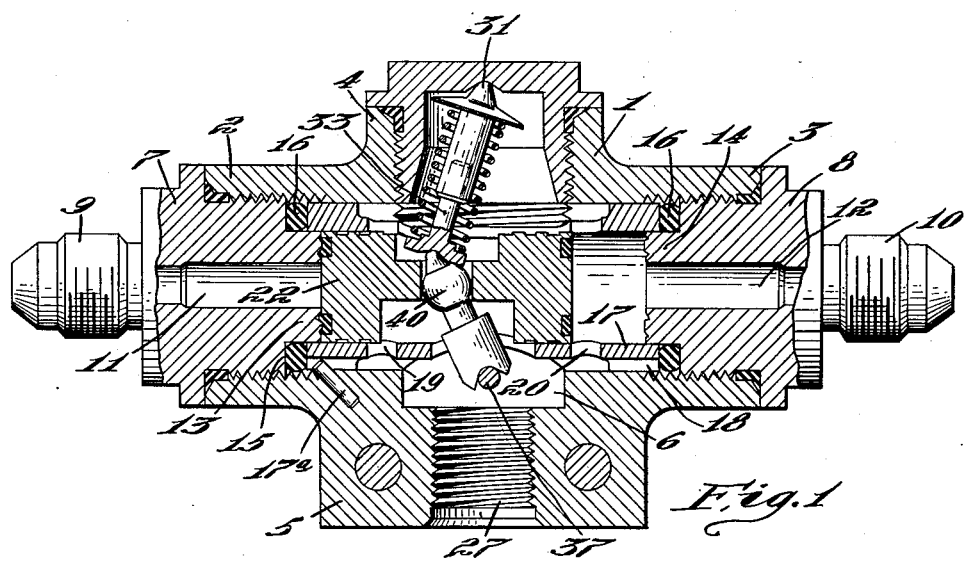
Fig. 1 is a longitudinal section through the valve, showing the piston seated against the left-hand seat.

Referring to the drawings, the numeral 1 designates the casing of the valve. This casing is usually a casting, for example of aluminum or other appropriate material, and is here shown as of cruciform shape in longitudinal, axial section, comprising the left and right hand transverse arms 2 and 3, the upper leg 4 and the lower leg 5. The transverse arms and upper and lower legs are hollow and communicate with the interior chamber 6. The arms 2 and 3 are internally screw threaded for the reception of externally screw threaded plugs 7 and 8 which are screwed into the respective arms, preferably with interposed packing to insure a tight joint. The outer ends of the plugs 7 and 8 are provided with nipples 9 and 10 for the ready connection of fluid conduits.

The plugs 7 and 8 are provided with axial bores 11 and 12 constituting fluid passages, these passages being axially aligned. The plugs 7 and 8 are provided at their inner ends with coaxial inwardly extending bosses 13 and 14 which provide radial shoulders 15 forming abutments for resilient packing gaskets 16 which embrace the bosses 13 and 14 respectively.

A cylindrical guide sleeve 17, which may, for example, be of stainless steel or other corrosion-resistant material, is arranged within the chamber 6, the sleeve being coaxial with the fluid passages 11 and 12 and being of such internal diameter that its ends may fit snugly over the inner end portions of the bosses 13 and 14, the end surfaces of the sleeve contacting the packing gaskets 16. Externally, the end portions of the sleeve 17 are provided with a keyway 18. A pin 17ª, projects into the keyway and prevents rotation of the sleeve within the casing. Ports or passages 19 and 20 are provided in the walls of the sleeve 17, one or more of such ports or passages being arranged adjacent to but spaced from each end respectively of the sleeve and providing communication between the interior of the sleeve and that portion of the chamber 6 which is external to the sleeve. The sleeve 17 also has diametrically opposite, elongate slots 21 and 26 (Fig. 2) at its mid-portion. The key or pin 17ª prevents rotation of the sleeve so that the slots 21 and 26 are always at the bottom and top respectively.

A valve piston 22 is arranged to slide within the sleeve 17, the piston having a sliding fit within the sleeve. At its central portion the piston is provided with inwardly extending coaxial slots 23 and 24 united by a bore 25 of smaller diameter, the right and left hand portions of the cylindrical wall of the bore 25 constituting abutment surfaces for contact by the actuator, hereafter described. As illustrated, the piston is provided with peripheral fluid grooves *g*.

The lower leg 5 of the casing has a passage 27 which, as here shown, is internally screw threaded for the reception of the end of a fluid conduit. The upper leg 4 of the casing is also internally screw threaded for the reception of a screw threaded, hollow cap 28 whose top 29 is provided at its under surface with a depression 30 which receives the generally conical upper end portion 31 of the upper arm of a toggle-lever device. This upper arm is extensible, comprising the outer elongate sleeve 32 and the inner sliding rod 33, the latter having an enlarged head 34 (Fig. 2) at its lower end which forms an abutment for the lower end of a coiled spring 35, the upper end of which engages the under surface of a head 36 on the part 32. This spring constantly urges the parts 32 and 33 in opposite directions, thus tending to increase the effective length of the upper arm of the toggle. The lower arm 38 of the toggle is notched at its lower end and rests upon a fixed fulcrum bar 37 extending transversely across the lower part of the chamber 6. This rigid lower arm 38 extends up through the elongate slot 21 in the guide sleeve and its upper end 39 (of generally conical shape) is received in a depression in the lower face of the part 34, the arrangement being such that the upper and lower toggle arms are capable of relative angular movement while remaining in endwise contact, although without being actually attached together. The lower lever arm 38, which is rigid and which constitutes the operative or actuator element of the toggle, is provided at a point intermediate its ends with a spherical enlargement 40 which is located in the central bore 25 of the piston 22 and always contacts the right and left portions of the wall of the bore 25 at points in the longitudinal axis of the piston. The force applied by the actuator lever 38 to the piston is directed axially of the piston and in the axial line of the valve seats.

In order to insure a fluid-tight seal, both at high and low pressures, without requiring extreme precision in machining the parts, each of the end faces of the piston is provided with a concentric annular groove which receives an annulus 41 (Fig. 4) of elastically deformable sealing material, for example rubber, which is bonded to the piston so that it can not become loose or drop out of the groove. Each valve seat comprises a vertical annular flat face 42 (Fig. 4) adjacent to the fluid passage through the seat, this surface being designed for direct metal-to-metal contact with the end surface of the piston inwardly of the groove which receives the material 41. Outwardly of this contact surface 42, the valve seat is provided with a pair of concentric clearance grooves 43 and 44 separated by a projecting annular rib 46 which, in radial section, is of truncated triangular form, its flat radial face lying in a plane (Fig. 4) beyond and to the right of the plane of the contact face 42. The metal-to-metal contact at the face 42 supports the ultimate seating pressure; an annular clearance 42a being provided between the groove 43 and the inner surface of the casing 2. This arrangement permits the use of rubber as the sealing material, although the pressure to which the rubber may be subjected exceeds the normal physical strength of the rubber. When the piston moves toward the seat, the projection 46 first engages the rubber to provide a seal and as the pressure increases, the rubber is deformed and flows radially into the spaces 43 and 44 forming two radially spaced annular ribs. At the end of the piston movement the surface 42 makes metal-to-metal contact with the face of the piston. The valve herein described is particularly designed for use in an installation in which the passages 11 and 12 are the inlet passages. When so employed, and when the piston is seated as shown in Figs. 1 and 4, a higher pressure will subsist in the spaces 43 and 44 than in the idle inlet 11, but since there is a metal-to-metal contact inwardly of the groove 44, the rubber 41 is prevented from being overloaded, cut, or extruded by the action of the high pressure fluid.

Figure 2:
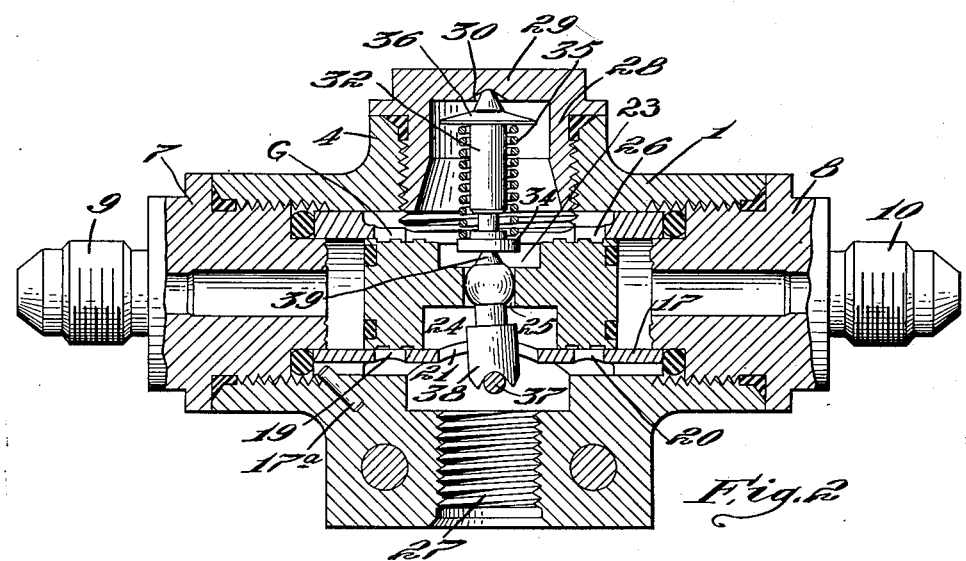
Fig. 2 is a similar view but showing the piston in its mid-position.

When pressure is supplied through the inlet passage 11 with the piston 22 seated, as shown in Fig. 1, the piston will remain seated until sufficient force is developed to overcome the fluid pressure acting on the right hand end of the piston as well as the force exerted by the spring 35 acting through the toggle levers. As the pressure increases at the inlet 11 relatively to the pressure at the inlet passage 12, the piston starts to move away from the left hand seat. However, fluid cannot flow from the passage 11 into the chamber 6 until the piston has moved to the right (as viewed in Fig. 1) sufficiently to uncover the aperture or apertures 19 and to cover the aperture or apertures 20. As shown in Fig. 2, where the piston is in its mid-position, it will be seen that both apertures 19 and 20 are closed so that, for an instant, fluid cannot flow from either inlet passage 11 or 12 into the chamber 6 and so to the outlet. When the piston has moved to the right beyond the mid-position shown in Fig. 2, even to a very slight extent, the force stored up in the spring 35 during the movement of the piston from the position of Fig. 1 to that of Fig. 2, is suddenly freed, and acting through the spherical enlargement 40 of the actuator lever 38 directly against the wall of bore 25, greatly accelerates the movement of the piston toward the right, causing it to seat firmly against the seat at the inner end of the plug 8. Obviously when the relative intensity of the pressures are reversed, as respects the passages 11 and 12, the piston will move in the opposite direction, the toggle acting in the same manner, with a snap action, to accelerate the final motion of the piston and insure firm and leaktight seating of the piston against the left hand seat.

Even though, in moving toward one of the seats, for example that carried by the plug 8, the inlet passage 12 should be blocked, for example, by oil or other fluid, the movement of the piston toward that seat is not prevented since the piston does not have to enter the passage 12, and since there is a slight clearance between the piston and its guiding sleeve 17, allowing fluid, entrapped between the end of the piston and the seat which it is approaching, to seep out between the piston and sleeve and escape through the apertures 20.

The arrangement above described provides in a very simple manner for obtaining the desired objects, it being noted in particular that the piston is very freely movable and that the force exerted by the toggle mechanism is directed always along the axial line of the piston so that it does not increase the frictional resistance of the piston to motion nor cause eccentric pressure of the piston against the guiding walls of the sleeve.

It is further to be noted that by the arrangement disclosed interflow between the passages 11 and 12 is completely prevented; a very firm and leaktight contact is provided between the end of the piston and the valve seat, and the piston is moved solely by the differential pressure without the assistance of external forces such as motor devices auxiliary to the valve itself.

While a desirable embodiment of the invention has been illustrated by way of example it is to be understood that the invention is broadly inclusive of any and all modifications falling within the scope of the appended claims.

I claim:

1. In combination in a shuttle valve, a casing of cruciform shape having an internal chamber, a plug fitting into each transverse arm of the casing, each plug having an axial flow passage and a valve seat at its inner end, an elongate sleeve within the chamber coaxial with the valve seats and extending from one plug to the other, the sleeve having a fluid passage through its wall adjacent to each of its ends, a piston slidable within the sleeve, the opposite ends of the piston being designed to engage the valve seats and close the fluid passages in the respective plugs, the lower leg of the casing having a passage communicating with said chamber, a hollow cap fitted into a bore in the upper arm of the casing, and a toggle comprising a lever fulcrumed at its upper end within said cap, said lever being extensible in length, a spring tending to increase its length, a second lever fulcrumed at its lower end within the lower part of said chamber, the upper end of said latter lever and the lower end of said first lever abutting but being free for relative angular movement, the piston having a transverse bore through which the second lever passes, the latter lever having a part intermediate its ends which contacts the piston only at the axis of the latter.

2. In combination in a shuttle valve, a casing having axially aligned internally screw threaded openings, a screw threaded plug fitting within each opening, each plug having an axial fluid-flow passage and having an annular seat surface at its inner end, a guide sleeve within the casing coaxial with said threaded openings, the inner end portions of the plugs fitting within the opposite ends respectively of the sleeve, packing interposed between the opposed surfaces of the sleeve and the respective plugs, a piston which slides with slight clearance within the sleeve, the opposite end faces of the piston being substantially flat but each having therein an annular groove of substantial radial width, an annular mass of resiliently deformable material filling each groove and being bonded to the wall of the groove, the seat having concentric grooves of such diameters that they are substantially opposite the inner and outer concentric walls respectively of the groove in the piston, the latter groove being of an inner diameter greater than that of the annular seat surface of the corresponding plug thereby providing an annular portion of the end face of the piston for metal to metal contact with the seat surface of the plug, the seat having means for indenting the deformable material as the piston approaches the seat, thereby to flow said material radially into the concentric grooves in the seat.

3. In combination in a shuttle valve, a casing having axially aligned, internally screw threaded openings, a screw threaded metallic plug fitting within each opening, each plug having an axial flow passage and having an annular radial shoulder and a cylindrical axial boss at its inner end, the end surface of each boss being shaped to provide a flat annular metallic seat face bordering its flow passage, the end of each boss also having an annular rib projecting beyond the plane of its seat face and bounded by coaxial grooves in the end of the boss, a resilient packing annulus embracing each boss and resting upon the adjacent radial shoulder, an elongate guide sleeve whose opposite ends fit snugly about the bosses of the respective plugs and contacts the resilient packing annuli, and a piston which slides within the sleeve, each end of the piston having an annular face designed to make metal to metal contact with the seat face of the corresponding plug thereby to close the flow passage through the plug, each end of the piston having therein an annular groove and a mass of resiliently deformable material filling said groove, the diameter and location of said latter groove being such that the deformable material is contacted by the annular rib on the plug before the head makes metal to metal contact with the seat surface of the plug.

4. In combination in a shuttle valve, a casing having axially aligned, internally screw threaded openings, a screw threaded plug fitting within each opening, each plug having an axial fluid-flow passage and having an axial boss at its inner end of a diameter less than that of the screw threaded portion of the plug, the annular, inner face of each boss constituting a valve seat, an elongate guide sleeve whose opposite ends fit snugly about the bosses of the respective plugs, means operative to prevent relative rotation of the sleeve and casing, a packing gasket embracing each boss and with which the end surface of the sleeve contacts, the sleeve having apertures in its wall adjacent to each of its ends, and a piston slidable within the sleeve, the piston being of such length that when one end is in contact with one valve seat, its opposite end leaves uncovered the apertures in the sleeve at the opposite end of the casing, and spring means operative to resist motion of the piston away from either seat until sufficient pressure is developed to overcome the spring.

KARL H. PECH.

References Cited in the file of this patent

UNITED STATES PATENTS

| Number | Name | Date |
| --- | --- | --- |
| 767,732 | Bromley | Aug. 16, 1904 |
| 1,033,103 | Humphrey | July 23, 1912 |
| 1,764,193 | Bruehl | June 17, 1930 |
| 1,847,073 | Ernst | Mar. 1, 1932 |
| 2,300,694 | Overbake | Nov. 3, 1942 |
| 2,339,378 | Clench | Jan. 18, 1944 |
| 2,354,791 | Boldt | Aug. 1, 1944 |
| 2,417,494 | Hoof | Mar. 18, 1947 |
| 2,440,478 | Kehle | Apr. 27, 1948 |
| 2,481,460 | Williams | Sept. 6, 1949 |
| 2,524,951 | Ashton | Oct. 10, 1950 |

FOREIGN PATENTS

| Number | Country | Date |
| --- | --- | --- |
| 543,894 | Great Britain | of 1942 |